(No Model.)

W. F. PATTERSON.
PUZZLE DEVICE.

No. 600,696.  Patented Mar. 15, 1898.

Witnesses.
A. V. Groupe
Walter C. Pusey.

Inventor.
Walter F. Patterson,
per John R. Nolan,
Attorney.

THE NORRIS PETERS CO., PHOTO-LITHO., WASHINGTON, D. C.

UNITED STATES PATENT OFFICE.

WALTER F. PATTERSON, OF PHILADELPHIA, PENNSYLVANIA, ASSIGNOR TO HIMSELF AND RICHARD J. BOYLE, OF SAME PLACE.

PUZZLE DEVICE.

SPECIFICATION forming part of Letters Patent No. 600,696, dated March 15, 1898.

Application filed September 28, 1897. Serial No. 653,307. (No model.)

*To all whom it may concern:*

Be it known that I, WALTER F. PATTERSON, a citizen of the United States, residing at the city and county of Philadelphia and State of Pennsylvania, have invented certain new and useful Improvements in Puzzle Devices, of which the following is a full, clear, and exact description, reference being had to the accompanying drawings, forming a part of this specification.

The nature of this invention is a puzzle device comprising in its construction a two-part receptacle whereof each part is provided in its inner face with a series of concentric grooves or channels in the walls of which are formed notches or recesses, the two parts of the receptacle being rotatably connected, the grooves thereof corresponding with each other to provide inclosed annular spaces or trackways, and the notches or recesses in the opposing walls of the respective parts being so located relatively to each other that when one or both of the parts is or are partially turned or rotated certain notches in the opposing walls are brought together or into register in a manner to afford between adjacent trackways openings for the passage from one trackway to the other of balls or other movable objects contained in the receptacle, whereby by properly manipulating the receptacle such balls or objects may be directed from the innermost or central trackway to and through the successive trackways and be finally discharged therefrom at the outer edge or periphery of the device.

The invention also embodies details of construction which will hereinafter appear.

Figure 1:
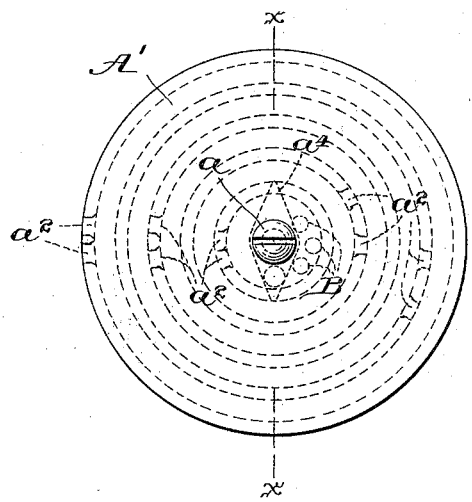
Figure 2:
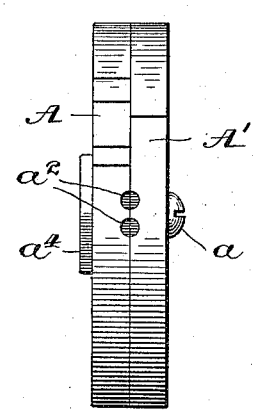
Figure 4:
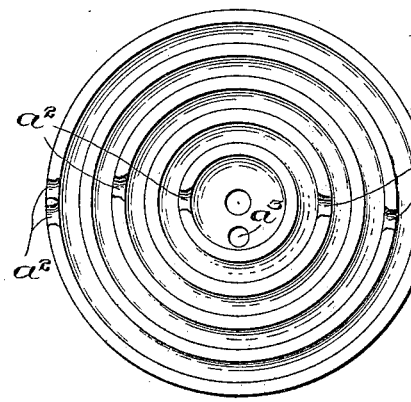
Figure 3:
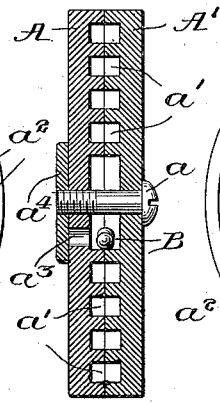
Figure 5:
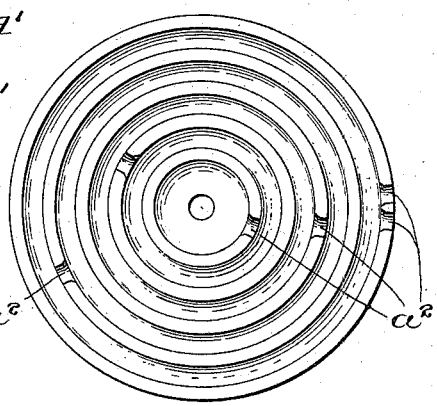

In the annexed drawings, Figure 1 is a plan of the device. Fig. 2 is a side view thereof. Fig. 3 is a vertical section, as on the line $xx$ of Fig. 1. Figs. 4 and 5 are inside views of the respective disks.

A A' are two disks centrally connected by a pivot-screw $a$, so as to be independently rotatable thereon. The inner or opposing faces of the disks are provided with corresponding concentric grooves $a'$, which constitute inclosed annular spaces or trackways for the reception and passage of balls B or other appropriate movable objects. The walls of the grooves in each disk are provided with notches or recesses $a^2$, which are so located that when one or the other of the disks is properly turned predetermined notches in the opposing walls are brought together or into register, so as to afford between two adjacent spaces or trackways an opening of sufficient size to permit the passage of a ball or balls from one trackway to the other.

In one of the disks, at a point adjacent to the pivot, is an opening $a^3$, by way of which a ball or balls may be introduced to the central space or trackway, the projecting end of the pivot-screw being provided with a suitable nut or head $a^4$, by means of which the opening may be closed. The ball or balls having been thus applied one or the other of the disks is manipulated, so as to effect communication between the central trackway and the next adjacent trackway, as above stated, and to allow the ball or balls to pass to the latter. Continuing the operation communication is likewise effected between the trackways in succession until the ball or balls have passed to the outermost trackway, in which event the ball or balls are permitted to escape by way of the notches in the outer wall of the latter.

The periphery of the device is preferably provided with appropriate marks to indicate the "combination," so to say, of the notches, and thus enable a person familiar with the same readily to solve the puzzle.

It will of course be understood that the number of the notches in the disks may be increased or diminished, as desired, and that the notches may be variously arranged in respect to each other without in any case departing from the invention.

I claim—

1. A puzzle comprising a two-part receptacle whereof the parts are provided with corresponding circular grooves or channels having in their respective walls relatively-located openings or notches, one of said parts being provided with an inlet adjacent to the center thereof, and means whereby said parts are rotatably connected, substantially as described.

2. A puzzle comprising a two-part receptacle whereof the parts are provided with corresponding circular grooves or channels having in their respective walls relatively-located openings or notches, one of said parts being provided with a transverse inlet adjacent to the center thereof, a pivoted head for closing said inlet, and means whereby the parts are rotatably connected, substantially as described.

3. A puzzle comprising a two-part receptacle whereof the parts are provided with corresponding grooves or channels having in their respective walls relatively-located openings or notches, means whereby said parts are rotatably connected, and a ball or movable object confined in said receptacle and adapted by manipulation of the parts to pass from the innermost groove to and through the successive groove, and finally through the registering openings in the periphery of the parts, substantially as described.

4. A puzzle comprising two disks provided with corresponding concentric grooves or channels having in their walls relatively-located openings or notches, one of said disks being provided with an inlet adjacent to the center thereof, a central pivot connecting said disks, and a nut or head on said pivot whereby the inlet may be opened or closed, substantially as described.

5. A puzzle comprising a two-part receptacle whereof the parts are provided with corresponding circular grooves or channels having in their respective walls relatively-located openings or notches, one of said parts being provided with a transverse opening or inlet, means whereby said parts are rotatably connected, and indicating means on the exterior of said parts located relatively to said openings or notches, substantially as described.

In testimony whereof I have hereunto affixed my signature in the presence of two subscribing witnesses.

WALTER F. PATTERSON.

Witnesses:
G. W. FISHER,
PETER S. BOYLE.